Nov. 11, 1952   G. T. RANDOL   2,617,316
AUTOMOTIVE TRANSMISSION CONTROL
Filed April 30, 1947   5 Sheets-Sheet 1

INVENTOR:
Glenn T. Randol,
BY
Harness, Dickey & Pierce.
ATTORNEYS.

Nov. 11, 1952   G. T. RANDOL   2,617,316
AUTOMOTIVE TRANSMISSION CONTROL
Filed April 30, 1947   5 Sheets-Sheet 2

INVENTOR:
Glenn T. Randol,
BY
Harness, Dickey & Pierce.
ATTORNEYS.

Nov. 11, 1952  G. T. RANDOL  2,617,316
AUTOMOTIVE TRANSMISSION CONTROL
Filed April 30, 1947  5 Sheets-Sheet 3

INVENTOR:
Glenn T. Randol,
BY
Harness Dickey-Pierce
ATTORNEYS.

Nov. 11, 1952 G. T. RANDOL 2,617,316
AUTOMOTIVE TRANSMISSION CONTROL
Filed April 30, 1947 5 Sheets-Sheet 5

INVENTOR:
Glenn T. Randol,
BY
Harness, Dickey & Pierce
ATTORNEYS.

Patented Nov. 11, 1952

2,617,316

UNITED STATES PATENT OFFICE 2,617,316

AUTOMOTIVE TRANSMISSION CONTROL

Glenn T. Randol, Fort Lauderdale, Fla.

Application April 30, 1947, Serial No. 745,010

48 Claims. (Cl. 74—740)

The present invention relates to power-drive systems and is particularly adapted for use in connection with the power-drive mechanisms of automotive vehicles, although not restricted to such use.

An important object of the invention is to provide an improved controlling system for the torque-converting gearing of an automotive vehicle.

A more specific object of the invention is to provide such a controlling system which is adapted to be quickly and easily installed in automotive vehicles of types essentially standardized in their construction as of the present, without requiring any alteration of any of the major structural components of vehicles in which the system is installed.

Another object is to provide such a controlling system which is adapted for use in conjunction with an automotive vehicle equipped with a standardized type of overdrive fourth speed unit and with a conventional selective sliding change-speed gear transmission having three forward speeds, the controlling system being improved with respect to the manner in which it enables the driver to shift the gears of the transmission and also to control the overdrive unit all by means of a single hand lever, which may be the hand lever ordinarily used for controlling the transmission alone, mounted on the steering column or in any other suitable and convenient location.

Another object is to provide such an improved controlling system which enables the ordinary shifting movements of the hand lever to be performed in the normal manner which is now conventional in manually shiftable automotive transmissions, to establish the ordinary reverse drive and the three usual forward speeds up to and including direct-drive, means being incorporated whereby, after the hand lever has been shifted to the conventional direct-drive position, it becomes possible to impart to the same hand lever a distinctive supplemental movement which renders the overdrive unit operative to establish the overdrive gear ratio.

An object related to that last stated is to provide such a controlling system wherein the overdrive gear cannot be established until after the conventional transmission has been shifted to high gear, and the overdrive gear cannot remain effective after the conventional transmission has been shifted out of the high gear position.

A further object is to provide such a control system for transmission gearing incorporating a separate or distinctly operable overdrive unit wherein preselective shifting is provided between normal high gear or direct-drive and overdrive gear, but preselective shifting is not provided in the conventional transmission gears. Thus the driver may operate the standard transmission ratios in the conventional manner, may shift manually to overdrive with the same shifting lever, but the actual establishing of the overdrive will not occur until a further act is performed, such as the momentary disengagement of the engine torque-transmitting clutch, while after the car is in the overdrive gears, the shift lever may be returned to the direct-drive position without thereby releasing the overdrive. The vehicle will then continue in overdrive until the next time the clutch is actuated, at which time the preselected return shift to direct drive will occur. This arrangement possesses the important advantage of accommodating a very rapid return to high gear, and subsequent more rapid acceleration of the vehicle than would be possible in overdrive. The driver is thus enabled to exercise forethought in a manner which is not possible either with conventional transmissions or with automatic transmissions of the types now employed. My improved controlling system also, as noted above, automatically disables the overdrive gear whenever the hand-shift lever is moved away from the high-gear position toward a lower gear. With ordinary manually-controlled overdrive units, and with some automatic overdrive units as they have been provided upon vehicles in the past, the driver might find himself in a lower gear but with the overdrive unit still in operation. The acceleration rate of the vehicle upon the next opening of the throttle would accordingly be lower than the driver might expect, and it will be realized that such an unexpected reduced acceleration rate is, under some driving conditions, extremely hazardous.

Another object of the invention is to provide an improved controlling system of the character indicated adapted to be incorporated in a motor vehicle having conventional engine, friction clutch and transmission components, the friction clutch being operable by a foot pedal, the transmission being shiftable by a gear-shift lever mounted upon the steering column, and an overdrive unit being arranged between the transmission and the final drive, these further components also being of conventional character, and the invention including novel means whereby the hand-shift lever is movable to and from a distinct supplemental position to engage and disengage the overdrive unit, and a selector valve being provided movable by the shift lever in response to such movement of the lever to and from the aforementioned distinct positioning thereof, the movements of the selector valve representing positions adapted to direct a motivating fluid to and from the overdrive unit to cause shifting thereof, and an interrupter valve being arranged in series with the selector valve and motivated in a novel manner whereby it normally remains in a closed position in which it prevents such fluid flow and thus prevents actuation of the overdrive unit, novel means being provided for actuating the interrupter valve in response to depression of the foot pedal as, for example, in normal operation of the aforesaid torque-transmitting clutch.

An object related to that last mentioned is to provide novel pedal-controlled actuating means for the interrupter valve whereby a snap action is imparted to such interrupter valve providing for quick and full opening thereof and whereby closing movement of such interrupter valve is delayed as the clutch pedal is released to control re-engagement of the clutch, such delayed closing insuring maintenance of a fully conductive fluid connection to the overdrive unit for a sufficient time for adequate operation of such unit.

Another related object is to provide such an arrangement wherein very slight travel of the foot pedal is sufficient to actuate the interrupter valve despite the above-noted delayed closing action.

Still another object of the invention is to provide such an improved controlling system for a standard underdrive transmission and an overdrive unit, which controlling system may be entirely mounted, insofar as its principal components are concerned, upon the cover plate of such a standard transmission, the arrangement being such that no parts within either the transmission or the overdrive unit need be disturbed in installing my improved controlling system.

Other objects and advantages will be apparent upon consideration of the present disclosure in its entirety.

In the drawings:

Figure 1A is a fragmentary perspective view of a part of the steering column, hand-shift lever and associated indicator gate plate;

Figure 1:
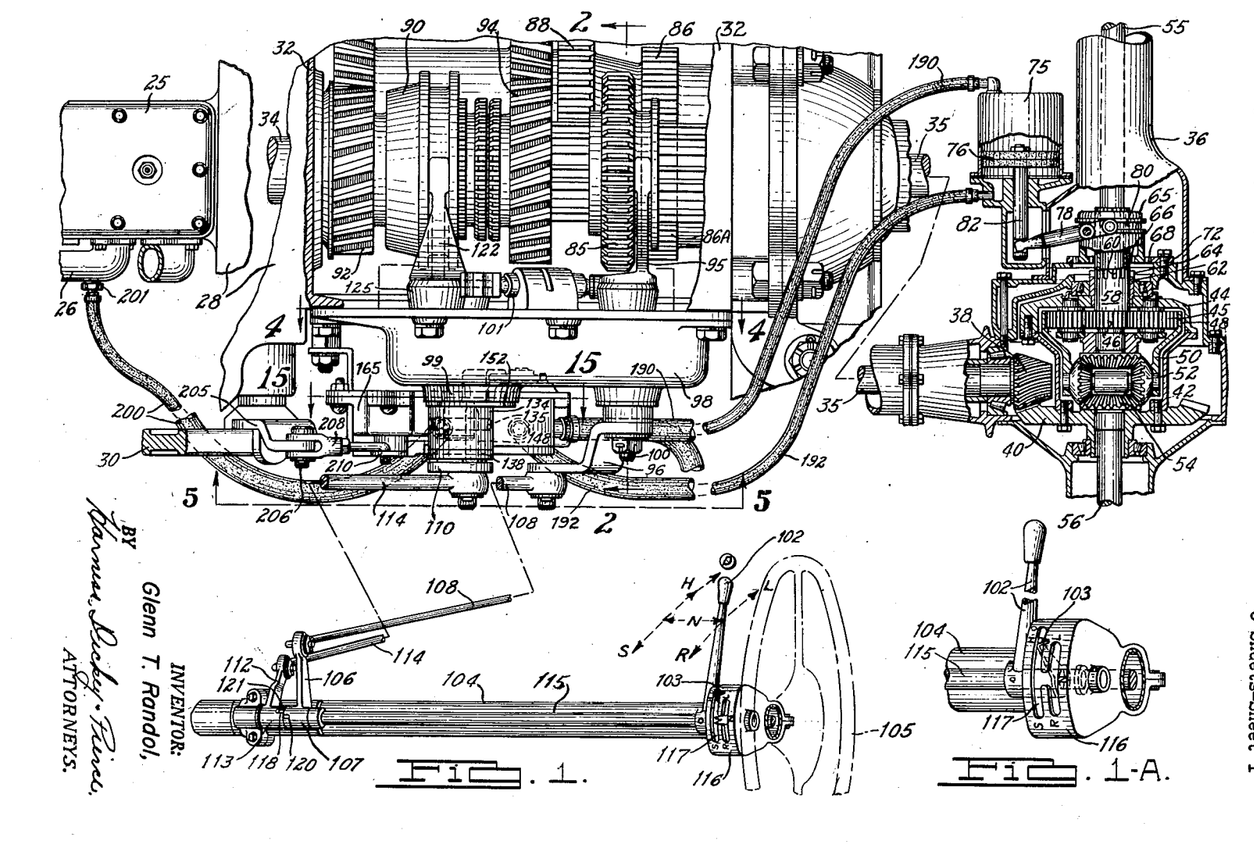
Figure 1 is a partly schematic plan view of a controlling system incorporating the present invention, fragmentarily showing the related parts of a motorcar upon which the system is installed, certain of the components of the motorcar being drawn to different scales and somewhat disaligned to aid in the clarity and completeness of the depiction.

Referring now to the drawings, and first to Figure 1 in connection with the conventional automotive components with which my improved control system is associated, reference character 25 designates generally an internal combustion engine of a motor vehicle, the engine and other components of the vehicle being illustrated only fragmentarily, since in themselves they form no part of my present invention. It will be apparent that in their details of construction these standard components might be varied widely without departure from the spirit of this invention. The engine is illustrated as provided with an intake manifold 26 within which a pressure drop occurs when the engine is in operation. The driving connection between the engine and the final drive of the vehicle may be selectively interrupted by means of a torque-transmitting friction clutch which is not shown, but the casing of which is fragmentarily illustrated at 28. This clutch is adapted to be released through the agency of a foot pedal 30, by movement of such pedal from the position in which it is shown in full lines in Fig. 7 to the position indicated in dotted lines in that view.

The transmission mechanism is housed in a casing 32 and is illustrated as of a type currently provided in a well known make of passenger automobile, although it will be recognized that this is subject to variation. The transmission input shaft is designated 34, while the vehicle propeller shaft 35 constituting the output shaft of the transmission carries the drive to the rear axle assembly, the housing of which is generally designated 36.

The rear axle assembly is shown as incorporating, in addition to the conventional differential mechanism, an overdrive gear unit of a variety which is also commercially known and available upon the open market for installation in certain types of motorcars. The bevel pinion 38, driven by the propeller shaft, drives the differential bevel ring gear 40 in the conventional manner. The gear 40 is mounted for free rotation and carries rigidly attached to one face a concentric substantially cylindrical extension 42 having an inwardly extending end portion 44 forming a cage for the overdrive planet pinions 45. Overdrive planet pinions 45 mesh with a sun gear 46 and with an internal toothed ring gear 48 surrounding the pinions. A lateral extension 50 carrying and shown as formed integrally with the gear 48 and projecting back into the interior of the spider 42 forms a supporting cage for the differential spider gears 52, which may be journaled therein in the conventional manner upon radial axes as shown. Spider gears 52 mesh with and serve to drive conventionally arranged bevel side gears as 54 fast upon the inner ends of the rear axle shafts 55, 56.

The overdrive sun gear 46 is fast upon and shown as formed integrally with a sleeve 58 loose on the right-hand axle spindle 55 and provided with longitudinal splines 60. Loose upon the sleeve 58 is a collar 62 formed with crown teeth 64 at one end. A generally cylindrical positive toothed clutch element 65 is slidably mounted upon the sleeve 58 and provided with internal splines (undesignated) engaging the splines 60 so that the clutch member turns as a unit with the sleeve. At its inner end the clutch element is provided with radially inwardly projecting teeth 66 engageable with the teeth 64 when the clutch is at the inner extremity of its travel. The clutch is also provided with radially outwardly projecting teeth 68 selectively engageable with conformable teeth 70 internally formed upon an annular member 72 fixedly positioned within the axle housing 36.

Figures 2, 3, 5:
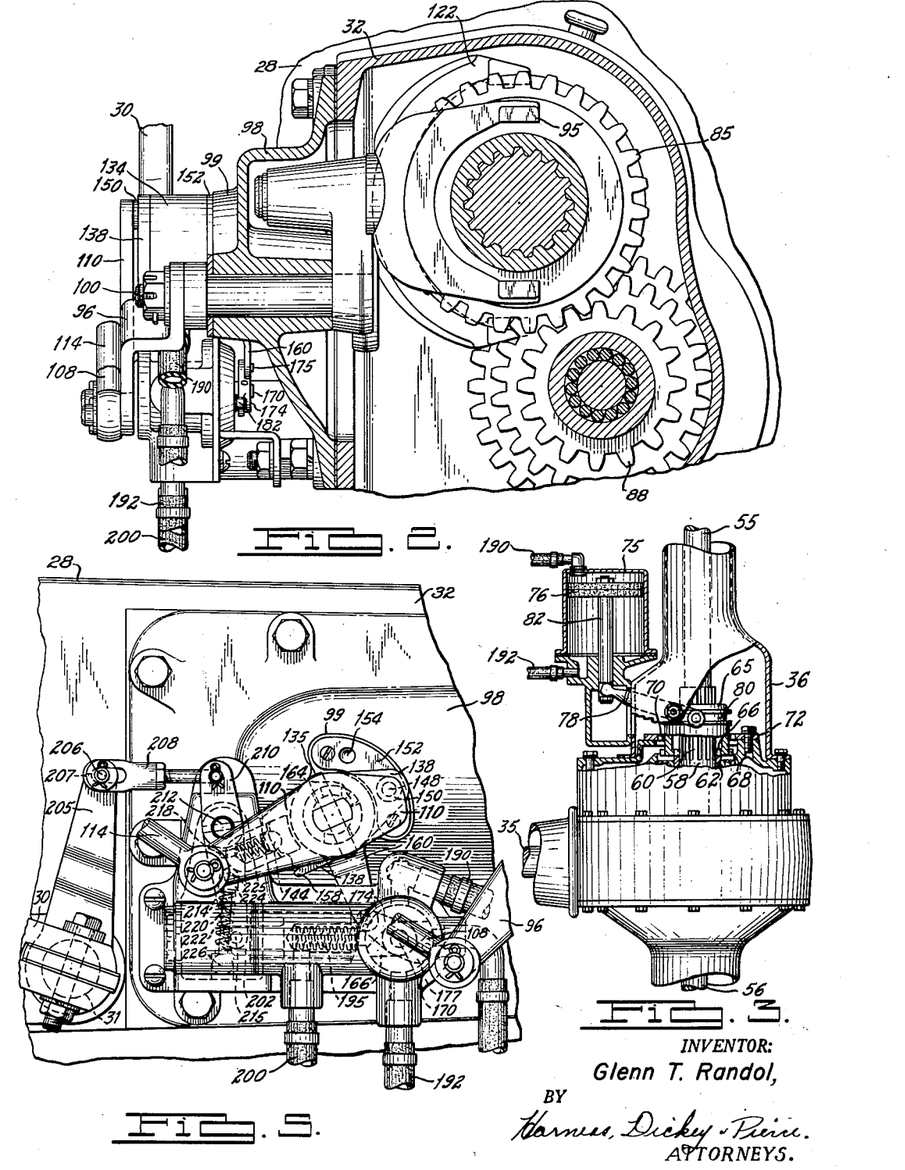
Figure 2 is an incomplete cross-sectional view taken substantially on the line 2—2 of Figure 1 and looking in the direction of the arrows.
Figure 3 is a fragmentary view, partly in plan and partly in horizontal section, of the overdrive unit depicted in Figure 1 but showing the parts in different positions of adjustment.
Figures 5, 6, 7, and 8 are fragmentary elevational views of a part of the controlling mechanism taken substantially on the line 5—5 of Figure 1 and looking in the direction of the arrows, showing the parts in different positions of adjustment.
Figure 4:
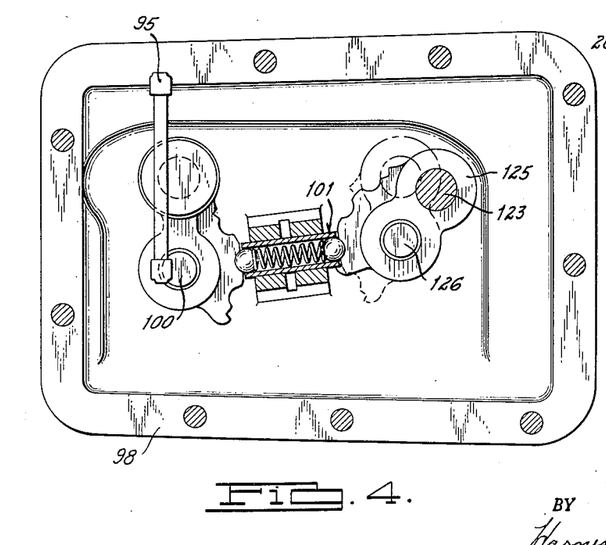
Figure 4 is a fragmentary, sectional elevational view taken substantially on the line 4—4 of Figure 1 and looking in the direction of the arrows.

It will be seen that when the clutch collar 65 is in the position shown in Figure 3, in which its teeth 66 engage the teeth 64, the sun gear 46 and planet cage portion 44 are locked to rotate as a unit. The overdrive assembly is thus rendered inoperative, and the drive from the bevel gear 40 turns all of the overdrive gears as a unit, thereby rotating the spider 50 at the same speed and transmitting a direct drive to the rear axle spindles in the conventional manner through the differential spider gears 52. When the clutch collar 65 is at the other extremity of its travel, as shown in Figure 1, its teeth 68, engaging fixed teeth 70 of annulus 72, lock the sun gear 46 against rotation. Collar 62 is then free to rotate and the drive from the bevel gear 40 turns the planet cage 44, forcing the overdrive planet pinions 45 to roll upon the sun gear, spider 50 being thereby driven at an increased speed ratio to impart an overspeed drive to differential spider gears 52 and, accordingly, to the rear axle spindles.

Clutch collar 65 is adapted to be shifted by a servomotor unit comprising a cylinder 75 fixedly attached to the rear axle housing 36 and containing a piston 76 suitably mechanically connected to the clutch collar, as by means of a yoke-type lever 78 pivoted in the housing and having a forked inner extremity engaging a suitable groove 80 in the clutch collar, while its outer extremity is pivotally connected to and actuatable by the piston rod 82.

Since the present invention is also concerned with the operation of the transmission mechanism, primarily from the standpoint of maintaining the present type of manual control of the transmission undisturbed while yet providing for control of the overdrive assembly by means of the same hand-shifting lever which was used to control the transmission, it may also be desirable to outline herein certain features of construction and operation of the transmission, in sufficient detail to assist in comprehension of the present invention.

The transmission mechanism is shown as including a first and reverse speed sliding gear assembly 85 illustrated in neutral position in Figure 1 and adapted to be moved to the rear to mesh with the countershaft reverse gear 86 and simultaneously with a reverse idler 86A for reverse, or to be moved forwardly to mesh with the countershaft first-speed gear 88 to establish the first speed drive. Second and high speed (direct-drive) are established by means of a shiftable blocker synchronizer assembly 90, indicated as mounted in the conventional manner between the main driving gear 92 and the second-speed main shaft gear 94. The blocker synchronizer assembly is also movable from an intermediate neutral position in either direction, rearward movement serving to couple the second-speed gear 94 to the main shaft for second-speed drive, while when the assembly 90 is moved forwardly to the position shown in Figure 1, it couples the transmission main shaft directly to the driving start 34 to establish direct-drive through the transmission in the usual manner.

The entire assembly of shifting forks and actuating means therefor is supported upon the transmission side cover plate 98. Shiftable gear 85 is movable by means of a shifter fork 95 actuatable in the conventional manner as through the agency of a shifting lever 96. Lever 96, fast upon the outer extremity of the supporting and actuating shaft 100 for the fork 95, is actuatable from the hand-shift lever 102, supported in the usual manner upon the steering column 104 adjacent the steering wheel 105. An actuating lever 106 rockably supported by and near the lower extremity of the steering column is coupled to the arm 96 by means of a link 108, these parts also being conventional in their arrangement, as will be apparent. The operating connection between the hand-shift lever 102 and the shifting lever 110 for the second-high gear blocker synchronizer assembly 90 is also conventional in its general arrangement, an arm 112 rockably supported by the steering column adjacent the arm 106 being operatively connected to the shifting arm 110 supported upon the transmission cover plate, such connection being provided in a manner analogous to that for the first and low-gear shifting assembly, as by the link 114.

The hand-shift lever is rigidly attached to and projects radially from a shaft 115 carried by and extending parallel to the steering column, the shaft and lever assembly being rockable about the axis of the shaft and also movable longitudinally of the column during shifting to accommodate movement of the lever in a conventional shifting pattern such as that denoted by appropriate letters upon the indicator gate plate 116 mounted upon the steering column adjacent the inner extremity of the lever. At its lower extremity, the shaft 115 is provided with a diametrically projecting cross pin 118, these parts also being conventional in their disposition. It will be recognized that when the lever, and accordingly the shaft, are raised, the cross pin 118 lies within the diametric slot 120 in the hub 107 of the arm 106. When the lever 102 is then rocked between the reverse and low-speed positions, designated R and L respectively upon the gate plate 116, the arm 106 is correspondingly rocked, the motion being transmitted through the link 108 and arm 96 to the fork 95 and thereby to the shiftable gear 85 in the usual manner. When the shifting lever 102 and shaft 115 are lowered so that the pointer 103 travels in the lower leg of the gate slot 117, the pin 118 lies in the slot 121 formed in the upper extremity of the hub 113 of the arm 112. The slots 120 and 121 are so positioned as to be aligned with one another and to form in effect an uninterrupted passage when both arms 106 and 112 are in neutral position.

The means connecting the arms 112, 110 is of conventional nature, as indicated, but the means connecting the arm 110 to the yoke 122 which serves to shift the blocker synchronizer assembly 90 is of special construction. This connecting mechanism, which presently will be described in detail, is so constructed and arranged that when the shift lever 102 is moved in the conventional manner between second, neutral, and high-gear positions, the fork 122 and blocker synchronizer 90 are correspondingly moved in the conventional manner. The portion of the gate slot 117 containing the high-speed or direct-drive position (designated H) is somewhat elongated, as best shown in Figures 1 and 1A, however, to provide for the hand lever to be moved supplementary from the high-gear position to an overdrive position designated O which is also referred to as the supplemental or preselective position. When the hand lever is so moved the blocker synchronizer 90 remains in the direct-drive position, and it also remains in that position while the hand lever is returned from the overdrive position to the high-gear or direct-drive position. Thereafter, however, the hand lever may be moved to any other selected position in the usual manner, and the first effect of movement of the hand lever back toward neutral is to return the blocker synchronizer to the neutral position in the conventional manner.

Figures 6, 9, 10, 11, 13, 14:
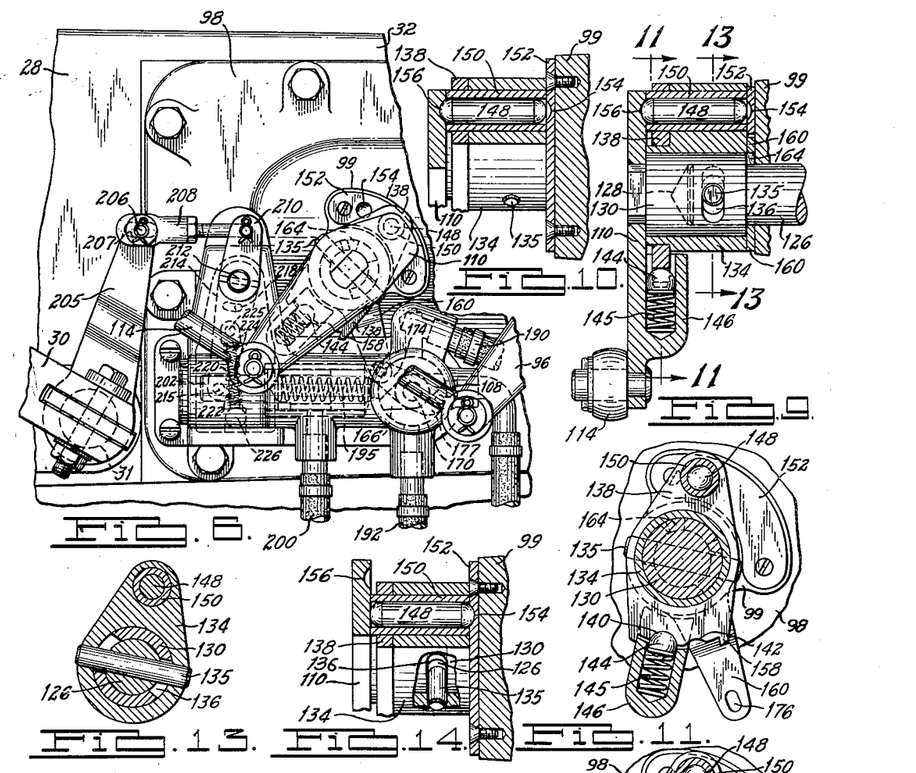
Figures 9 and 10 are sectional details taken substantially on the lines 9—9 and 10—10 respectively of Figure 7 and looking in the direction of the arrows.
Figures 11 and 12 are sectional views taken substantially on the line 11—11 of Figure 9 and looking in the direction of the arrows, showing the parts in different positions.
Figure 13 is a cross section taken substantially on the line 13—13 of Figure 9 and looking in the direction of the arrows.
Figure 14 is a sectional view taken substantially on the line 14—14 of Figure 8 and looking in the direction of the arrows.

The yoke 122 has an integral stem 123 fitted in, and rockable about its own axis in, an arm 125. The arm 125 is fast upon a shaft 126 rotatably supported by and projecting from the cover plate 98 as best shown in Figure 9. The conventional shifting movements of the yokes and the shiftable elements 85, 90 may be controlled by combined detent and interlock means of conventional character such as is generally indicated at 101. The outer extremity of the shaft 126 projects through and from a boss portion 99 formed upon the exterior of the cover 98, such extremity of the shaft being piloted in a bore 128 formed in a hub 130 which is limitedly rotatable with respect to the shaft. The shifting lever arm 110 is rigidly attached to the hub 130. Surrounding the cylindrical exterior of the hub 130, which is concentric with the axis of the shaft 126, is a sleeve 134 rotatable with respect to the hub. A cross pin 135 is fixed in and near the extremity of the shaft 126. The pin projects through a pair of diametrically opposed peripheral slots 136 in the hub 130, and is long enough to project into the side walls of the sleeve 134 which is bored to accurately receive the pin, as best shown in Figure 13. Sleeve portion 134 accordingly turns as a unit with the shaft 126. Fixedly secured to the sleeve 134 behind and close to the lever 110 is a detent plate 138 having an arcuate bottom portion concentric with the axis of the shaft 126, such arcuate bottom portion being provided with a pair of rounded notches 140, 142. The notch 140 is considerably deeper than the notch 142 for a purpose which will presently appear. A detent ball 144 is adapted to seat in one or the other of the notches and is urged thereinto by a spring 145. The detent ball and spring assembly is housed in a suitably pocketed portion 146 integrally formed upon the rear of the lever 110.

The sleeve assembly 134 supports an interlock mechanism adapted to prevent the lever 110 from moving independently of the shaft except when the lever is moved beyond the high speed position, as previously noted. The interlock mechanism comprises a pin 148 mounted in the sleeve assembly above the common axis of the shaft, hub, and sleeve and slidable parallel to such axis, as in a tube 150 fitted in sleeve assembly 134 and detent plate 138 and projecting through both of these to expose both rounded ends of the interlock pin 148. A segmental detent plate 152 is fixed to the face of the boss 99 in alignment with the path of movement of the interlock pin during rocking movement of the sleeve assembly. A pocket 154 is formed in the face of the plate 152 and is contoured and positioned to receive the rounded rear extremity of the interlock pin when the pin is swung, by means of the lever 110, to the position it occupies when the blocker synchronizer assembly 90 is in high gear position. The blocker synchronizer is shown in high gear position in Figure 1, while the lever 110 is shown in the high gear position in Figure 7. When the interlock pin 148 is thus aligned with the pocket 154 it is free to move out of a similar pocket 156 formed in the opposed portion of the rear face of the lever 110. The lever 110 is thus freed for limited independent movement (counterclockwise as viewed in Figures 7 and 8) from the high speed position shown in Figure 7 to the overdrive position shown in Figure 8, without thereby rocking the sleeve 134 or connected shaft 126. The blocker synchronizer accordingly remains unmoved and in the high speed position shown in Figure 1 during such independent overtravel movement of the lever 110 and connected actuating parts to its overdrive supplemental position "O." The pin 148 is of such length that when its inner nose is not in the pocket 154 it rides upon the outer face of the plate 152 and its front nose is thereby held in the pocket 156, locking the sleeve assembly 134 to the lever 110 so that these parts then move in unison. Abutment portions as 158, integral with the detent plate 138 and projecting downwardly below and at either end of the notched area thereof, limit the independent travel of the lever with respect to the plate, supplementing the action of the pin and slot connection 135, 136 in this respect.

Surrounding the shaft 126 between the boss 99 and the hub and sleeve portions 130, 134 is an arm 160 which may be formed of sheet metal, having an arcuate slot portion 162 pierced or otherwise formed therein and indicated as constituting an integral extension of the central shaft hole 163 formed in the hub of the lever. A rigid tongue portion 164 which may be integral with the hub 134 projects into the slot portion 162 and provides in conjunction therewith a lost-motion connection accommodating limited independent rotative movement of the hub and lever 160.

Figures 16, 17, 18:
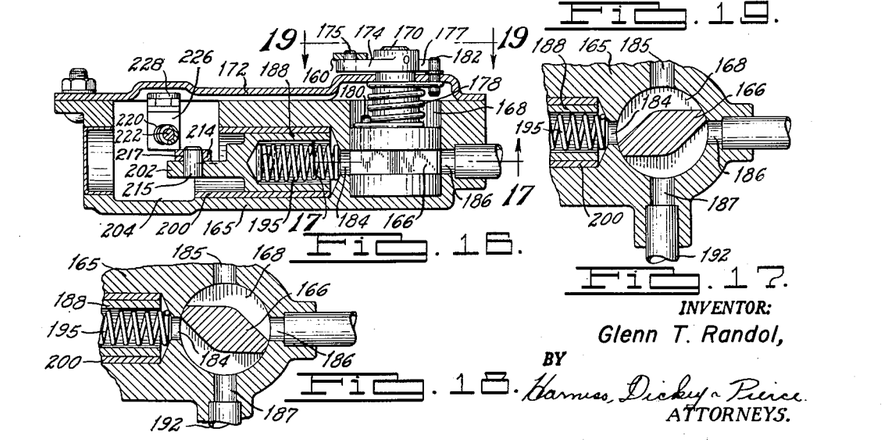
Figure 16 is a horizontal sectional plan view taken substantially on the line 16—16 of Figure 7 and looking in the direction of the arrows.
Figures 17 and 18 are sectional elevational views taken substantially on the line 17—17 of Figure 16 and looking in the direction of the arrows, showing one of the valve members in different positions assumed during operation.

The lever 160 constitutes actuating means for a selector valve of the vane type housed in a casing 165. The selector valve element is designated 166. Valve element 166 is rotatable within a cylindrical chamber 168 formed in casing 165, the valve element being fast upon a shaft 170 which projects through the valve casing cover plate 172 and from the rear thereof where it carries a rigidly attached arm 174. The end of arm 174 overlaps lever arm 160 and is connected to and actuatable by the same. Connection between arms 160, 174 is effected by means of a pin 175 fast in and projecting from the arm 174 and engaging in a slot 176 formed in and near the end of lever 160. A torsion spring 178 (Figure 16) wrapped about shaft 170 within the casing 165 reacts against the valve 166 to yieldably urge it toward and tend to maintain it in and return it to the position in which it is shown in Figure 17. The torsion spring reacts at its ends against a pin 180 fast in the rear face of the valve and against a pin 182 secured in the cover plate 172 and projecting inwardly therefrom. The pin 182 also projects rearwardly from the face of the cover plate 172 and serves as an abutment adapted to limit the rotative travel of the arm 174 and thereby restrict the angular movement of the selector valve 166. This limit is reached when an abutment arm 177 formed integrally with the arm 174 engages the pin 182 to prevent clockwise movement of the valve beyond the approximate position indicated in Figure 18.

Figure 7:
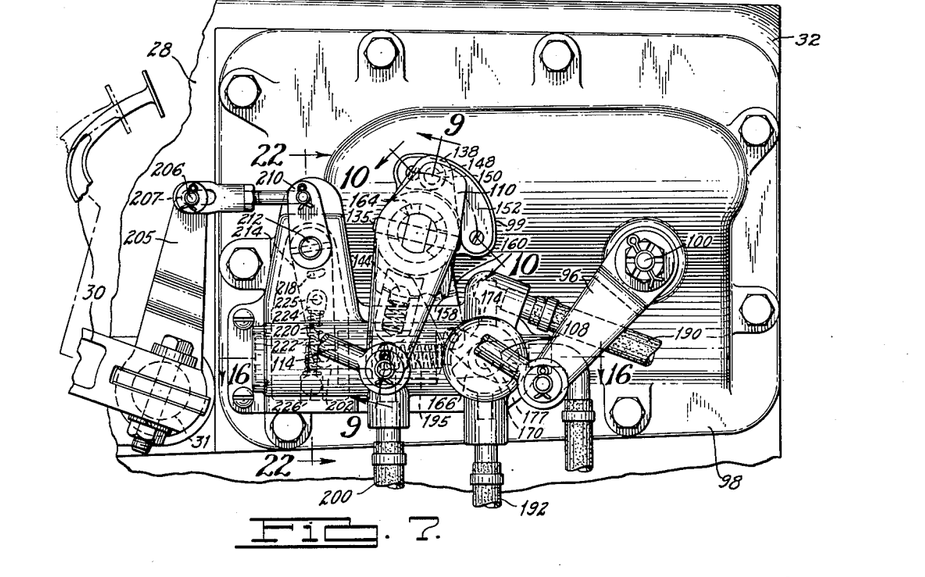
Figure 8:
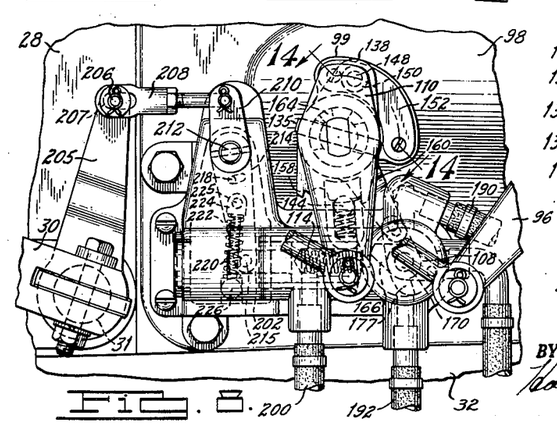
Figure 12:
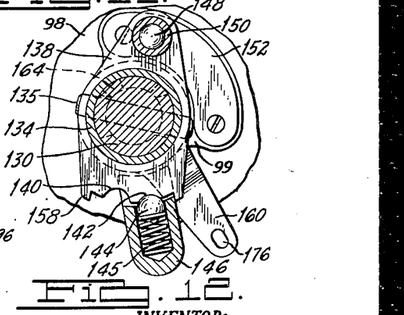

Considering the operation of the mechanical components thus far described it will be noted that upon movement of the hand shift lever 102 between the low, neutral and reverse positions, the shiftable gear 85 is moved in the conventional manner and that upon movement of such lever between the second speed, neutral and direct-drive positions the blocker synchronizer 90 is also moved in the conventional manner, the movement being in fact imparted to the shifting lever 110 through the agency of link and lever connections which are entirely conventional, as will be apparent. During such movement of the lever 110 between the neutral, second-speed, and direct-drive positions the interlock pin 148 is maintained in engagement with the pocket 156 and accordingly locks to the lever 110 the shaft 126 by which the shifting fork 122 is directly actuated. Lever 110 and the fork 122 thus move in unison as though the lost-motion connection means above described were not present. The second speed position of the lever 110 and associated parts is shown in Figure 5, and the neutral position resulting from initial counterclockwise rotation of these parts is shown in Figure 6. When the direct-drive or high speed position shown in Figure 7 is reached by further counterclockwise rotation, however, the interlock pin 148 is free to move into the pocket 154 in plate 152 (see Figure 9) and the lever 110 is thereby freed to accommodate independent overtravel thereof from the direct-drive position shown in Figure 7 to the overdrive position shown in Figure 8 without moving the fork 122 and connected sleeve 134, the blocker synchronizer 90 accordingly remaining in the direct-drive position as explained above.

The length of the slot portion 162 in the lever 160 is such that when the lever 110 and its rigidly attached hub 130 reach the direct drive position, the lug 164 brings up against the end of the slot 162, and continued movement of the lever and hub from the direct-drive position to the overdrive position is effective to swing the lever 160 through an angle corresponding to movement of the valve 166 from the position in which it is shown in Figure 17 to that in which it is shown in Figure 18. It will also be noted that the length of the slot 162 is such that the lug 164 may travel freely therein at all times, except when the hub and lever 110 are moved beyond the direct-drive position toward the overdrive position. Thus no movement is imparted to the lever 160 except during movement of the hand-shift lever 102 between the direct-drive and overdrive positions. When the hand lever is returned from the overdrive to the direct-drive position, the lever 160 and valve 166 are returned to the position shown in Figures 7 and 17 by the torsion spring 178 (Figure 16).

The valve chamber 168 is provided with four ports peripherally spaced from one another at angles of approximately 90° and designated 184, 185, 186, and 187. The port 184 may be termed the eduction port of the valve and is adapted to be selectively connected to the intake manifold 26 in such manner as to provide communication between the manifold and either of the ports 185 or 187. At the same time, port 186 provides connection between the atmosphere and the port which is not so connected to the intake manifold.

Between the eduction port 184 and the manifold an interrupter valve 188 of the hollow piston type is provided. The interrupter valve is so constructed and so mechanically connected to the clutch pedal 30 as to remain closed at all times, except when the clutch pedal is depressed beyond a predetermined position. When, in the depression of the pedal 30 to release the main clutch, such predetermined position is passed, the interrupter valve is opened with a snap action, establishing communication between the intake manifold and the eduction port 184. Port 185 is connected to one end of the cylinder 75 as by the flexible tube 190, while similar connection is provided between the port 187 and the other end of cylinder 75 by the flexible tube 192. It will be seen that when the valve 188 is open and the valve 166 is in the position shown in Figure 17, communication is established between the intake manifold and the upper end of the cylinder 75, as the latter is viewed in Figure 1. The resultant reduction of pressure in such upper end of the cylinder moves the crown clutch element 65 from the overdrive position shown in Figure 1 to the position to lock up the overdrive unit in the manner shown in Figure 3 and previously described, to establish direct-drive through the rear axle overdrive unit. When, with the valve 188 open, the valve 166 is moved to the position shown in Figure 18, a corresponding reduction of pressure is effected in the lower end of the cylinder 75, moving the piston to the position in which it is shown in Figure 1 and thereby moving the clutch element 65 to the position also shown in Figure 1 to establish overdrive in the manner previously described.

The piston valve 188 is urged toward closed position by a helical compression spring 195 housed therewithin and within the cylinder 200 in which the valve travels. The piston valve 188 is movable toward the selector valve 166 to compress the spring 195, to a position such that a port 196 which extends through the skirt of the piston valve is brought into registry with a passage 198 which extends through the wall of the casing 165 and through the aligned portion of the cylindrical liner 200 within which the piston valve travels. The passage 198 is connected by means of a suitable tube 200 and fitting 201 to the intake manifold 26. When the port 196 registers with the passage 198, communication between the intake manifold and the selector valve chamber 168 is established through fitting 201, tube 200, passage 196 and port 198, and through the hollow interior of the piston 188 and selector valve eduction port 184.

Lost motion connection is provided between the clutch pedal 30 and valve 188 by means of an arm 205 fixed to the clutch pedal shaft 31 and accordingly rockable by the clutch pedal. A pin 206 carried at the extremity of the arm 205 is slidably fitted in a slot 207 formed in one end of a link 208 which serves to connect arm 205 to an arm 210 fast upon a shaft 212 rotatably mounted in the wall of valve casing 165. The inner extremity of the shaft 212 projects into a chamber 204 in the casing 165 where it carries an arm 214 rigidly attached to the shaft and projecting downwardly therefrom and at its lower extremity connected to the valve 188 to actuate the latter, as by a suitable pin and slot connection. This connection does not incorporate lost-motion (except such as may be caused by ordinary tolerances) and is formed by a pin designated 215 carried by an integral pierced lug 202 extending from the head of the piston valve into the chamber 204. The slot in the end of lever 214 is designated 217. The limits of movement of the arm 214 and the connected valve member 188 are determined by an arcuate slot 216 formed in the arm 214, over-engaging a fixed pin 218 mounted in the side of the casing 165 and projecting into the slot.

Figure 21:
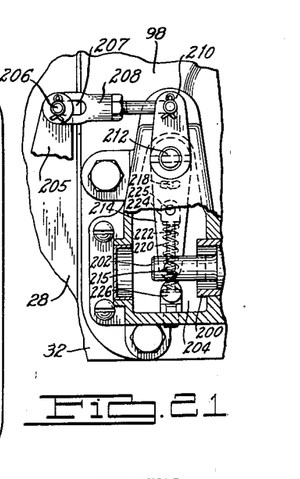
Figure 21 is a fragmentary view, partly in substantially central vertical section and partly in elevation, of a part of the control valve means.

Snap action is imparted to the valve 188 by overcenter means reacting against the arm 214 and also housed within the chamber 204. An overcenter spring 220 of the helical compression type is supported and guided upon a stem 222 fixedly attached at its upper end to a bracket 224 pivotally carried by one face of the arm 214 as by means of a pin 225. At its lower end the stem 222 is slidably supported in a pivoted cylindrical thrust and bearing block member 226 supported in the valve casing by means of the headed stem 228. It will be seen that the spring 220, bearing outwardly against the brackets 224, 226 urges the arm 214 and the connected valve 188 to either extreme position, acting to complete the movement of the arm 214 after the arm and stem 22 have passed through the dead center position in which they are axially parallel, which position is shown in Figure 21. The slot 207 in the link 208 is long enough to permit the arm and valve to complete their movement independently after the parts have passed over center in the manner indicated.

Figures 15, 19, 20, 22:
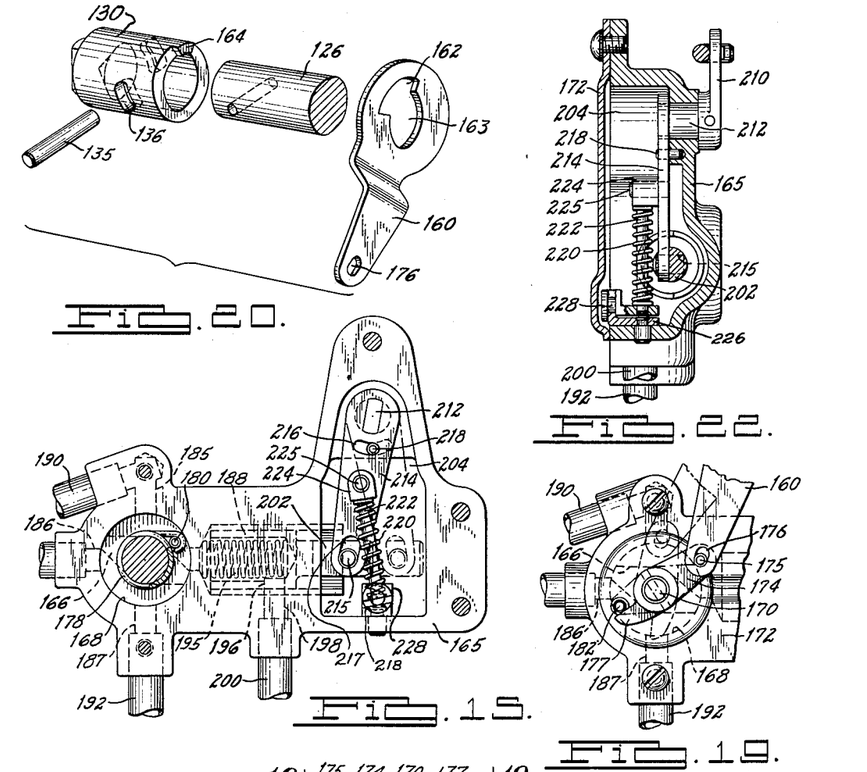
Figure 15 is a sectional elevational view taken substantially on the line 15—15 of Figure 1 and looking in the direction of the arrows.
Figure 19 is a fragmentary rear elevational view of a part of the control valve assembly, taken substantially on the line 19—19 of Figure 16 and looking in the direction of the arrows.
Figure 20 is an exploded perspective view of a part of the selector valve actuating means.
Figure 22 is a vertical sectional view taken substantially on the line 22—22 of Figure 7 and looking in the direction of the arrows.

In Figure 6, the pin 206 is shown positioned substantially midway of the length of slot 207, which is the position it normally occupies when the clutch is fully engaged, the clutch pedal portion 30 and connected arm 205 also shown in this view in the positions they occupy when the clutch is fully engaged. It will be noted that the arm 210 is in the position corresponding to closed positioning of the interrupter valve 188. If the clutch pedal is now depressed to disengage the friction clutch, the arm 205 will move forwardly to carry the pin 206 into engagement with the front extremity of the slot 207, the clutch being disengaged during this pedal movement. Continued movement of the foot pedal pulls the link 208 forwardly until the dead-center position shown in Figure 21 is reached, whereafter the shaft 212 and the attached arms 210, 214, snap quickly counterclockwise, as the parts are viewed in Figures 5, 6, 7, and 8 (counterclockwise as viewed in Figure 15), such movement of the parts being induced by the overcenter spring 220 and the interrupter valve 188 being thereby quickly moved to the fully opened position. The link 208 at this time normally moves faster than the arm 205 so that the front extremity of the slot 207 may move away from the pin 206 and the parts momentarily assume the positioning indicated in Figure 7. If the selector valve 166 is in its Figure 18 positioning, therefore, a full connection is thus immediately established between the servomotor 75 and the intake manifold 26. It will be appreciated that the interrupter valve is thus opened much more quickly than it would ordinarily be moved by direct connection with the clutch pedal, and that the operator is only required to depress the clutch pedal through a distance corresponding to approximately half that which would represent full travel of the valve. The operator may be expected to continue to depress the pedal through some additional distance after he has completed the movement necessary to actuate the interrupter valve. Such additional movement is not important insofar as the functioning of my improved control mechanism for the overdrive unit is concerned, except that it entails a delay which is desirable at this phase of the operation, so that when the driver subsequently releases the clutch pedal to return, the pin 206 must ordinarily travel the full length of the slot 207 before any movement is imparted to the interrupter valve. It will be appreciated that this provides for delayed closing of the interrupter valve, insuring that this valve will be maintained open long enough for full operation of the overdrive shifting servomotor 75. Since the engine clutch re-engages as the pedal moves outwardly in the zone corresponding to that in which the valve actuating mechanism is returned to the deadcenter position by engagement between the pin 206 and the rear extremity of the slot 207, a further natural delaying action results by reason of the fact that vehicle drivers customarily operate the clutch so as to control the clutch pedal to move only at a slow rate at such times, since rapid movement of the clutch pedal would cause jerky operation or lurching of the vehicle. The operator thus inherently provides for further delayed closing of the interrupter valve, and the connection between the servomotor and the manifold is accordingly maintained for a period long enough to insure proper actuation of the overdrive shifting clutch 65. It will also be appreciated that full valve movement is obtained in this manner with shorter travel of the clutch pedal than would otherwise be required.

Considering the operation of the power-shifting means for the overdrive unit, it will be observed that direct mechanical shifting of the selector valve 166 between the direct-drive and overdrive positions may be effected at any time by means of the hand-shift lever 102, but that operation of the overdrive-shifting clutch mechanism itself does not occur until the interrupter valve 188 is opened by depression of the clutch pedal to establish communication between the shift cylinder 75 and the intake manifold 26 in the manner previously described. When driving in either the direct-drive or overdrive ratio, therefore, the other of these two ratios may be manually selected in advance and rendered operative whenever subsequently desired simply by depressing the clutch pedal.

While it will be apparent that the preferred embodiment of the invention herein disclosed is well calculated to fulfill the objects and advantages first above stated, it will be apparent that the invention is susceptible of variation, modification and change without departing from the intended scope and fair field of the subjoined claims.

I claim as my invention:

1. Controlling means for a power-drive system of the variety which includes torque-converting means including an element shiftable to establish and interrupt driving connections of lower and higher speed drives, which system also includes separate torque-converting means and a member actuatable to establish and interrupt a drive of different speed through said separate torque-converting means, common actuating means for said element and said member including a lever movable to and between a plurality of distinct positions to actuate said element, and movable to and from another distinct position to actuate said member, a second actuating member actuatable by said lever to distinct positions bearing a fixed relationship to the aforementioned positions of the lever, said second actuating member being located appurtenant to one of said torque-converting means and operably connected to both of said torque-converting means.

2. Controlling means as defined in claim 1 including a housing containing said shiftable element, said separate torque-converting means being located outside said housing and said second actuating member being supported by said housing.

3. Means as set forth in claim 1 including an operating device for said first-mentioned actuating member located close to and movable by said second actuating member, releasable interlock means operably connecting said second actuating member and said operating device for movement together, and means for releasing said interlock means to accommodate separate operation by said same lever of said second actuating member and of the first-mentioned member actuatable to establish and interrupt the drive through said separate torque-converting means.

4. Means as set forth in claim 3 including camming means responsive to overtravel of the lever for releasing said interlock means.

5. Means as set forth in claim 3 including an interlock release element actuatable by and in response to overtravel of the lever and of said second actuating member.

6. Means as set forth in claim 3 including a housing for said first-mentioned torque-converting means, said housing having a cover, said second actuating member and said operating device and said interlock means being carried by the cover.

7. In combination with a variable drive power transmission including elements actuatable to establish and interrupt the transmission of power through underdrive power-conveying means of differing torque drives; overdrive means; means actuatable to render said overdrive means operative and inoperative; actuating means for said elements including a lever movable to lower drive, neutral and higher drive positions; and means responsive to unidirectional overtravel of said lever beyond said higher drive establishing position to actuate said second-named means actuatable to render said overdrive means operative and without operatively actuating said higher drive elements said overdrive when operative being unaffected upon movement of said lever back to said higher drive position.

8. Means as set forth in claim 7 in which said transmission includes a frame, said actuating means including members mounted on said transmission frame and actuatable by said lever to move said elements, said overdrive means and said lever being located at positions remote from said transmission, means providing mechanical connection between said lever and said actuating members mounted on said frame, fluid operable means for actuating said means for rendering the overdrive operative and inoperative, and mechanically actuatable fluid control means for said fluid operable means, said fluid control means being mounted on said frame and operably connected to said lever and to said actuating members.

9. Means as set forth in claim 7 in which one of said elements is movable to lower speed drive, higher speed drive and neutral positions, an actuating member mounted on said transmission and movable by said lever to lower speed, higher speed and neutral positions, said member also being progressively movable by said lever during overtravel thereof from and beyond said higher speed position and to another position to actuate said means for rendering the overdrive operative, means providing an operative connection between said member and said element whereby said element may be actuated between said lower speed, higher speed and neutral positions, and means for breaking said operative connection in response to movement of said member away from said higher-speed position toward said other position.

10. In a power-drive system comprising a change-speed gear transmission having a side cover, an auxiliary torque-converting unit apart from said transmission and of the type controllable by fluid pressure, mechanical control means for the transmission mounted on said cover, fluid control means also mounted on said cover and operably connected to said auxiliary unit and said mechanical control means, and a control handle remote from all of the previously mentioned structure and mechanically connected to and arranged to sequentially operate both of said control means.

11. In a power-drive system comprising a power transmitting clutch, a change-speed gear transmission having a side cover and arranged adjacent the clutch, an auxiliary torque-converting unit apart from said transmission and of the type controllable by fluid pressure, mechanical control means for the transmission mounted on said cover, fluid control means also mounted on said cover and operably connected to said auxiliary unit and said mechanical control, a control handle remote from all of the previously mentioned structure and mechanically connected to and arranged to sequentially operate both of said control means, and means responsive to operation of the power transmitting clutch including a mechanical connecting element extending between the clutch and said fluid control means for modifying the action of said last-named means.

12. Control means for an automotive transmission system including a power transmitting clutch, actuating means for controlling engagement and disengagement of the power transmitting clutch, a member movable by such actuating means, transmission means adapted to be driven through said clutch and incorporating selectively operable torque converting means whereby the vehicle may be driven in drives of different torque ratios, shifting means for controlling the operability of said torque converting means, said shifting means including an element movable to different positions corresponding to such different ratios, means for preventing effective functioning of said shifting means without preventing movement of said element, whereby preselective movement may be imparted to said element without establishing the drive corresponding to its instantaneous positioning, said means for preventing effective functioning of said shifting means including a disabling device movable to and from a position in which it disables the shifting means, means providing lost-motion connection between said device and said member, and a snap-acting over-center element reacting upon said disabling device.

13. Means as set forth in claim 12 including valving means operable by said disabling device, said over-center means tending to throw said valve toward either a fully opened or a fully closed position when said disabling device is moved past a dead-center position in response to actuation of said member, said lost-motion connection means accommodating free travel of said member prior to actuation of said disabling device during movement of the member from a position corresponding to full disengagement of the clutch toward a position corresponding to full engagement of the clutch.

14. Means as set forth in claim 12 including a valve operable by said disabling device, said over-center means tending to throw said valve toward either a fully opened or a fully closed position when said disabling device is moved past a dead-center position in response to actuation of the member, said lost-motion connection means accommodating free travel of the clutch-operated member prior to actuation of said disabling member during movement of the member from a position corresponding to full disengagement of the clutch toward a position corresponding to full engagement of the clutch, and being arranged to actuate said disabling device as the clutch approaches fully engaged position.

15. In combination with an automotive power-drive system including an engine, a power transmitting clutch, a change-speed transmission, a movable handle for controlling the action of the change-speed transmission, a selectively operable overdrive assembly, pedal operating means for the power transmitting clutch, a fluid pressure operable motor for rendering the overdrive assembly operative and inoperative, and preselective actuating means for said motor means including a valve, means for moving the valve including connecting elements operatively connecting the valve and handle, and disabling means preventing operation of said motor regardless of the position of said valve until predetermined actuation of said pedal, said disabling means including a second valve, and means operatively interconnecting said pedal and second valve including overcenter means for imparting motion to said second valve and tending to move said second valve to opposite extreme positions when an overcenter position is passed, and means providing lost-motion connection between said pedal and said overcenter means.

16. Means as set forth in claim 15 in which said lost-motion connection means is so arranged as to accommodate limited free travel of the pedal from clutch-engaged position toward clutch-released position without actuating said second valve, whereby said second valve may overtravel the pedal under the influence of said overcenter means during movement of the said second valve after said dead-center position is passed.

17. In combination with an automotive power-drive system including an engine, a power transmitting clutch, a change-speed transmission, a movable handle for controlling the action of the change-speed transmission, a selectively operable overdrive assembly, pedal operating means for said clutch, a fluid pressure operable motor for rendering the overdrive assembly operative and inoperative, a source of pressure fluid to exert a force to operate said motor, preselective actuating means for said motor including a valve means for moving the valve including connecting elements operatively connecting the valve and handle, disabling means preventing operation of said motor regardless of the position of said valve until predetermined actuation of said pedal, said disabling means including a second valve, and means operatively interconnecting said pedal and second valve including a mechanical connecting element extending between the second valve and said pedal.

18. In a transmission control for use with a transmission having means establishing a predetermined speed drive, and means to superpose a different drive thereon without disengaging the predetermined ratio, the combination of means movable from first to second position to establish the predetermined drive and to a supplemental third position, and mechanism to render effective the different drive superposing means, including control means operable by such movement of the movable means from second position to the supplemental third position, and additional means movable to an operating position, the drive superposing means being rendered effective by movement of the control means as aforesaid, and movement of the additional means to operating position, and means to render said drive superposing means ineffective when the control means is operated by the movable means to second position and movement of the additional means to an operating position.

19. In combination, a transmission having neutral and a plurality of speed drives, an overdrive shiftable from a first speed to a second speed drive, a shift means operable to a plurality of operating positions to establish different speed drives in the transmission, the shift means having supplemental movement from one of said operating positions, and mechanism to cause the overdrive to shift from its first to its second drive position upon supplemental movement of the shift means as aforesaid including control means moved from one to another position by movement of the shift means to said supplemental position, and additional means movable to an operating position, means to shift the overdrive to second speed drive when the control means is in said other position and the additional means is moved to its operating position, and means to return the overdrive to first speed drive when the control means is moved to its one position and the additional means is in operating position.

20. In a control for a transmission having a neutral condition and a plurality of speed drives each obtainable individually from the neutral position, and a superposing drive means to produce a different speed drive, the combination of means movable from neutral position individually to other operating positions, one for each of said first-named speed drives, to establish each of said drives, said last-named means being operable unidirectionally only from one of said operating positions to a supplemental position, and mechanism including means operated upon movement of the movable means into its supplemental position, to render the superposing means effective to produce a different speed, said movable means being movable to said supplemental position without disestablishing said one of said speed drives and back into an operating position without disestablishing the different speed drive.

21. In a control for selective transmissions having a plurality of speed drives and a supplemental speed drive, a first movable control member, movable to an operating position for each first-named speed drive, connections movable into operated position by movement of the member to one of its positions for use in effecting one of said first-named speed drives, said control member having supplemental movement from said one position to a supplemental position, said connections including means accommodating said supplemental movement by changing the connections from operated position aforesaid, and mechanism including means operated by said mechanism including also a second control member, operable into an operating position, and means actuated upon movements of the first control member to supplemental position, and of the second control member to its operating position, to effect the supplemental speed drive.

22. A control as in claim 21 wherein said first control member comprises a manually-operated shift lever.

23. A control as in claim 21 wherein one of the control members is manually-operated and the other pedally-operated.

24. A control as in claim 21 for use with the transmission as stated and with a power-transmitting clutch, wherein the second control member is connected for operation with the operation of the clutch.

25. A control as in claim 21 for use with a transmission as stated, and in an automobile with pedally-operable automobile control devices for controlling the delivery of energy from the engine to the wheels, and wherein the second control member is connected with one of said automobile control devices for operation thereby.

26. In a control for a variable-ratio gear transmission, a shift-lever movable in a conventional H-pattern for use in effecting neutral and the different gear ratios of said transmission, means providing unidirectional supplemental movement of the lever from a gear ratio operating position thereof substantially at the end of a leg of the H-pattern, to a position supplemental thereto, mechanism including means operated by said supplemental movement of the lever, said mechanism including also a second control member movable from a first to a second position, and means operatable by said supplemental movement of the shift lever and movement of the second control member to second position, to effect another associated gear ratio.

27. A control as in claim 26 for use with an automobile employing the transmission, the automobile having devices to regulate the delivery of power from the engine to the wheels, the control including the combination wherein the second control member is connected for operation with one of said regulating devices.

28. In a control for variable-ratio gear transmissions with supplemental gear ratio means, a shift-lever movable in conventional H-pattern for use in effecting neutral and the different gear ratios of said transmission, means providing unidirectional supplemental movement of the lever, from a gear ratio operating position at the end of a leg of the H-pattern, to a supplemental position, mechanism for rendering said supplemental gear ratio means effective, including a valve normally in a first open operative position for rendering said supplemental gear ratio ineffective, means operated only by supplemental movement of the shift-lever to operate the valve to a second open operative position, power means to operate the supplemental gear ratio means, and means to energize the power means, said energizing means being connected through the valve in second open operative position.

29. The control as in claim 28, wherein the power means and the means to energize it are reversible, said valve in first open operative position being connected with the energizing means to reverse it and render the supplemental gear ratio means inoperative.

30. In a control for transmissions having a plurality of gear ratios, a first control member movable into neutral position, and into each of a plurality of operating positions from neutral to effect a plurality of gear ratios, said member having supplemental movement from one of said operating positions, mechanism for effecting a different gear ratio, including a second control member movable to an operating position independently of the first control member, and means rendered operative by supplemental movement of the first control member and movement of the second control member to operating position, to actuate said mechanism for effecting said different gear ratio.

31. In a control for transmissions having a plurality of gear ratios, means including a manually-operable control member movable from neutral to each of a plurality of operating positions to selectively establish a plurality of gear ratios, said manual member being supplementally movable from one of said operating positions to a supplemental position, power means including energizing means for establishing an additional gear ratio, and mechanism including means operated by said supplemental movement of the manual member and an actuatable means actuated into an operating position to cause energization of the power means to establish the supplemental gear ratio.

32. In transmission control; a shifter shaft supported for rotative and axial movements; a pair of shifter arms on said shaft; means for selectively engaging the shaft with either arm by opposite axial movements of said shaft, said engaging means causing the engaged arm to rotate therewith, upon subsequent rotating of said shaft into selected operating positions; means for producing supplemental radial movement of said shaft and an arm from a selected one operating position thereof; a selector control device having an element movable to different operating positions; an actuator rotatable in unison with said shaft and arm to said selected one operating position; mechanical connecting means between the said movable element and actuator for moving said movable element when said actuator is additionally rotated by the aforesaid supplemental radial movement of said shaft and arm.

33. In a control for transmission mechanism providing a plurality of gear drives and neutral, and an overdrive shiftable from one gear drive to another, a shifter element movable to a plurality of operating positions and to neutral positions to operate the transmission mechanism to said different gear drives and neutral, first control means connected for operation by the shifter element, said control means being adapted to preset the overdrive for its first gear drive when the shifter element is in a selected position, and to preset the overdrive for its second gear drive when the shifter element is moved from said selected position to an overdrive position, second control means operable independently of the shifter element, from one operative position to another operative position, said second control means being connected to effectuate the shifting of the overdrive preselected by the first control means.

34. In transmission control; a shifter shaft supported for rotative and axial movements; a pair of shifter arms on said shaft; means for selectively engaging the shaft with either arm by opposite axial movements of said shaft, said engaging means causing the engaged arm to rotate therewith, upon subsequent rotating of said shaft into selected operating positions; means for producing supplemental movement of said shaft and an arm from a selected one operating position thereof; a selector control device having an element movable to different operating positions; an actuator movable in unison with said shaft and arm to said selected one operating position; connecting means between the said movable element and actuator for moving said movable element when said actuator is additionally moved by the aforesaid supplemental movement of said shaft and arm.

35. In mechanism for controlling a two-speed ratio gearing for driving the axle of a motor vehicle, said gearing being in turn driven by a variable-speed gear transmission selectively controlled by a gear-shift lever having a preselective supplemental movement from an operative speed position thereof, and an associated clutch controlled by a pedal; motor-power means operable for shifting said gearing; selective valve means for controlling the operation of said motor; mechanical means operatively connecting said selective valve means and gear-shift lever, and a second valve to said pedal, said lever and pedal being operable jointly or sequentially for opening both of said valves to cause said motor to shift said two-speed gearing alternately from one speed to the other in response to selective valve opening settings of said gear-shift lever at will within its aforesaid supplemental range of movement while said transmission is disposed operatively in high gear, and said pedal-operated valve is opened by a de-clutching movement thereof.

36. In mechanism for controlling a two-speed ratio gearing for driving the axle of a motor vehicle, said gearing being in turn driven by a variable-speed gear transmission selectively controlled by a gear-shift lever having a preselective supplemental movement from an operative speed position thereof, and an associated clutch controlled by a pedal; motor-power means operable for controlling said gearing; selective valve means for controlling the operation of said motor; mechanical means operatively connecting said selective valve means and gear-shift lever, and a second valve to said pedal, said lever and pedal being operable jointly or sequentially for opening both of said valves to cause said motor to control said two-speed gearing alternately from one speed to the other in response to selective valve opening settings of said gear-shift lever at will within its aforesaid supplemental range of movement while said transmission is disposed operatively in a speed, and said pedal-operated valve is opened by a de-clutching movement thereof.

37. In a control for a variable-speed drive transmission; a control-lever movable in a conventional H-pattern for use in selectively effecting neutral and the different speed drives of said transmission: means providing unidirectional supplemental movement of the lever from a predetermined speed drive operating position along a leg of the H-pattern, to a position supplemental thereto substantially at the end of said leg in the same plane of the aforesaid lever movement to its selected predetermined operating position; mechanism including means operated by said supplemental movement of the lever to effect combination of another speed drive with a selected operating speed drive of said transmission to produce a speed drive different from either of the first-named drives movable from one position to another and a pedally-operated lever movable from one position to another and having operative connection with said mechanism and being operative to effect movement of said mechanism to produce said other speed drive when said control-lever is moved into its supplemental position upon movement of said pedally-operated lever into its other position, and to return said different speed drive to said selected speed drive upon another operative movement of said pedally-operated lever into its other position, with said control lever in its predetermined operating position.

38. In a control for a variable-speed drive transmission, a control lever movable in a conventional H-pattern for use in selectively effecting the neutral and the different speed drives of said transmission: a second lever operatively connected with said control lever and a member rocked thereby to effect the high-speed drive of the transmission when said control lever is predeterminately moved to a position along a leg of the H-pattern, means providing unidirectional supplemental movement of the control lever from a high-speed drive operating position to a position supplemental thereto substantially at the end of said leg in the same plane of the aforesaid lever movement to its selected operating position comprising an interlock between said second lever and said member, releasing said second lever to move to a supplemental position and holding said member in a high-speed operating position, and means operated by said supplemental movement of said second lever to effect another associated speed drive.

39. The control according to claim 38, wherein the interlock comprises an interlocking pin connecting said second lever with said member and another member with respect to which said first member is relatively movable, and a camming connection between said second lever and said interlocking pin, releasing said second layer from said first member and engaging said pin with said second member, holding said first member in a high-speed operating position and accommodating movement of said lever to a supplemental position.

40. In a control for a variable-speed drive transmission, a control lever movable in a conventional H-pattern for use in selectively effecting the neutral and the different speed drives of said transmission: a rocking member, a second lever coaxial and operatively connected with said rocking member and moved by said control lever to move said rocking member and effect the high-speed drive of the transmission when said control lever is predeterminately moved to a position along a leg of the H-pattern, an interlocking connection between said second lever and said rocking member locking said rocking member for movement by said second lever to a high-speed operating position and locking said rocking member in said high-speed operating position and freeing said second lever to move to a supplemental operating position in the same direction upon unidirectional supplemental movement of the control lever from the high-speed drive operating position to a supplemental operating position substantially at the end of said leg, other drive mechanism for effecting another associated speed drive, a source of fluid power for effecting the other speed drive through said drive mechanism, and means operable by movement of said second lever to its supplemental position to connect said source of fluid power to said other drive mechanism to effect said other speed drive.

41. In a control for a variable-speed drive transmission, a control lever movable in a conventional H-pattern for use in selectively effecting the neutral and the different speed drives of said transmission: a second lever, means operatively connecting said control lever with said second lever and a rocking member rocked by said second lever to effect several of the different speed drives of the transmission when said control lever is predeterminately moved to a position along a leg of the H-pattern, means providing unidirectional supplemental movement of the control lever from one speed drive operating position to a position supplemental thereto substantially at the end of said leg in the same plane of the aforesaid plane of lever movement to its selected operating position comprising an interlock between said second lever and said rocking member, releasing said second lever to move to a supplemental position and holding said rocking member in a selected speed operating position, and means operated by the supplemental movement of said lever to effect another associated speed drive.

42. The control according to claim 38, including another member with repsect to which said rocking member is relatively movable and wherein the interlock comprises an interlocking pin connecting said second lever with said rocking member, and a camming connection between said second lever and said interlocking pin, releasing said second lever from said rocking member and engaging said pin with said other member and holding said rocking member in a selected speed operating position and accommodating movement of said second lever to a supplemental position.

43. In a control for a variable-speed drive transmission, a control lever movable in a conventional H-pattern for use in selectively effecting the neutral and the different speed drives of said transmission: a rocking member, a second lever coaxial with said rocking member and moved by said control lever to move said rocking member to effect one of the speed drives of the transmission when said control lever is predeterminately moved to a position along a leg of the H-pattern, an interlocking connection between said second lever and said rocking member, locking said rocking member for movement by said second lever to a selected speed operating position and locking said rocking member in said selected speed operating position and freeing said second lever to move to a supplemental operating position in the same direction, upon unidirectional supplemental movement of said control lever from the selected speed drive operating position thereof to a supplemental operating position substantially at the end of said leg, other drive mechanism operable for effecting another associated speed drive, power means including a source of fluid power for operating the drive mechanism to effect the other speed drive, and means operable by movement of said second lever to its supplemental position to connect said fluid power means to operate said other drive mechanism to effect said other speed drive.

44. In a control for a variable-speed drive transmission, a control lever movable into a plurality of selective speed operating positions to selectively effect the different speed drives to said transmission: a rocking member, a second lever coaxial with said rocking member and moved by said control lever to move said rocking member into position to effect a selected speed drive of the transmission when said control lever is in one of its selected speed operating positions, an interlocking connection between said second lever and said rocking member, locking said rocking member for movement by said second lever to a selected speed operating position and also locking said rocking member in said selected speed operating position and freeing said second lever to move to a supplemental operating position in the same direction, upon unidirectional supplemental movement of the control lever from the selected speed drive operating position to a supplemental operating position, another drive mechanism for effecting another associated speed drive, a source of fluid power, valve mechanism controlling the supply of fluid power from said source to said other drive mechanism for effecting the other speed drive through said drive mechanism, a third lever coaxial with said second lever, means connecting said third lever to said valve mechanism, and an engaging connection between said second lever and said third lever, operating said third lever to operate said valve mechanism, only when said second lever moves to a supplemental position.

45. In a control for a variable-speed drive transmission, a control lever movable into a plurality of selective speed operating positions, to selectively effect the different speed drives of said transmission: a rocking member, a second lever coaxial with said rocking member and moved by said control lever to move said rocking member into position to effect a selected speed drive of the transmission when said control lever is in one of its selected speed operating positions, an interlocking connection between said second lever and said rocking member, locking said rocking member for movement by said second lever to a selected speed operating position and also locking said rocking member in said selected speed operating position and freeing said second lever to move to a supplemental operating position in the same direction upon unidirectional supplemental movement of the control lever from the selected speed drive operating position to a supplemental operating position, another drive mechanism for effecting another associated speed drive, a source of fluid power, valve mechanism controlling the supply of fluid power from said source to said other drive mechanism for effecting the other speed drive through said drive mechanism, a third lever coaxial with said second lever, means connecting said third lever to said valve mechanism, and a lost-motion connection between said second and third levers accommodating free movement of said second lever with respect to said third lever when moving to its speed drive establishing positions and moving said third lever to operate said valve mechanism only when said second lever moves to a supplemental position.

46. In a control for a variable-spaced drive transmission, a control lever movable into a plurality of selective speed operating positions to selectively effect the different speed drives of said transmission; a rocking member, a second lever coaxial with said rocking member and moved by said control lever to move said rocking member into position to effect a selected speed drive of the transmission when said control lever is in a selected speed operating position, an interlocking connection between said second lever and said rocking member locking said rocking member for movement by said second lever to a selected speed operating position and locking said rocking member in said selected speed operating position and freeing said second lever to move to a supplemental operating position in the same direction upon unidirectional supplemental movement of the control lever from the selected speed drive operating position to a supplemental operating position, another drive mechanism for effecting another associated speed drive, a source of fluid power, fluid power operated means for effecting said other speed drive, two valves controlling the supply of fluid power to said fluid power operated means, one being a selecting valve and the other being a fluid power supply valve, said selecting valve being connected to said second lever and operated thereby only upon movement of said second lever to a supplemental position, to select said other drive, and the other being a power supply valve and being operated independently of said control lever to effect said other speed drive when said control lever is moved into said supplemental position, and to return said other speed drive to said different speed drives upon another operative movement of said power supply valve, irrespective of the position of said control lever.

47. In a control for a variable-speed drive transmission, a control lever movable into a plurality of selective speed operating positions for use in selectively effecting the different speed drives of said transmission: a rocking member, a second lever coaxial with said rocking member and moved by said control lever to move said rocking member into position to effect a selected speed drive of the transmission when said control lever is in a selected speed operating position, an interlocking connection between said second lever and said rocking member, locking said rocking member for movement by said second lever to a selected speed operating position and locking said rocking member in said selected speed operating position, and freeing said second lever to move to a supplemental operating position in the same direction upon unidirectional supplemental movement of the control lever from the selected speed drive operating position to a supplemental operating position, another drive mechanism for effecting another associated speed drive, a source of fluid power, fluid power operated means for effecting said other speed drive, two valves controlling the supply of fluid power to said fluid power operated means, one being a selecting valve and the other being a fluid power supply valve, a third lever coaxial with said second lever, means connecting said third lever to said selecting valve, an engaging connection between said second lever and said third lever operating said third lever to move said selecting valve into position to select said other speed drive only when said second lever moves to its supplemental position, a pedally-operated lever, and a connection between said pedally-operated lever and said power supply valve to operate said power supply valve to effect said other speed drive when said control lever is moved into its supplemental position.

48. In a control for change-speed transmissions having a plurality of gear drives, and an overdrive; means including a control member movable from a neutral position to an operating position to establish one of said drives, and accommodating additional movement of said member to a supplementary operating position; a control device actuatable to operating position; actuating means for said control device; mechanism operable to establish and disestablish overdrive including power means operated by actuation of said control device to operating position and movement of said control member into its supplementary operating and neutral positions, respectively, said mechanism being normally operable by said power means to disestablish overdrive, if established, with the control device actuated into operating position and the control member moved into its first-named operating position.

GLENN T. RANDOL.

REFERENCES CITED

The following references are of record in the file of this patent:

UNITED STATES PATENTS

| Number | Name | Date |
|---|---|---|
| 2,009,133 | Gerst | July 23, 1935 |
| 2,115,089 | Tenney | Apr. 26, 1938 |
| 2,136,721 | Maurer | Nov. 15, 1938 |
| 2,138,065 | Layman | Nov. 29, 1938 |
| 2,193,304 | Thompson | Mar. 12, 1940 |
| 2,254,334 | Vincent | Sept. 2, 1941 |
| 2,294,216 | Stallman | Aug. 25, 1942 |
| 2,337,417 | Russell | Dec. 21, 1943 |
| 2,348,424 | Shorter | May 9, 1944 |
| 2,365,732 | Snow | Dec. 26, 1944 |
| 2,445,716 | Sternberg | July 20, 1948 |